United States Patent [19]

Lorenz

[11] 4,305,030
[45] Dec. 8, 1981

[54] ELECTRONIC MOTOR BRAKING SYSTEM

[75] Inventor: Dennis K. Lorenz, Brookfield, Wis.

[73] Assignee: FMC Corporation, Chicago, Ill.

[21] Appl. No.: 159,326

[22] Filed: Jun. 13, 1980

[51] Int. Cl.³ .............................................. H02P 3/26
[52] U.S. Cl. .................................. 318/758; 318/759; 318/371
[58] Field of Search ............... 318/758, 759, 760, 761, 318/762, 370, 371, 375

[56] References Cited

U.S. PATENT DOCUMENTS

| | | | |
|---|---|---|---|
| 2,712,365 | 7/1955 | Burns | 318/372 |
| 3,581,168 | 5/1971 | Kirby | 318/759 |
| 3,897,595 | 7/1975 | Fearno | 318/212 |
| 4,195,225 | 3/1980 | Guttman | 318/762 |

Primary Examiner—David Smith, Jr.

Attorney, Agent, or Firm—Lloyd B. Guernsey

[57] ABSTRACT

The motor braking system for use with an alternating current motor and an AC power source includes a power circuit for supplying a DC braking current to the motor. A capacitor which was charged during motor operation, discharges when the motor is turned off and thus provides a pulse of energizing current to a contactor which quickly connects the power circuit to the motor and starts the electric braking cycle as soon as the AC source is disconnected from the motor. A timing circuit is also started and maintains the energizing current for a predetermined amount of time while the motor is coming to a stop. A mechanical brake may also be used to complete the stopping sequence if desired, with the mechanical brake being engaged when the braking current is terminated.

22 Claims, 1 Drawing Figure

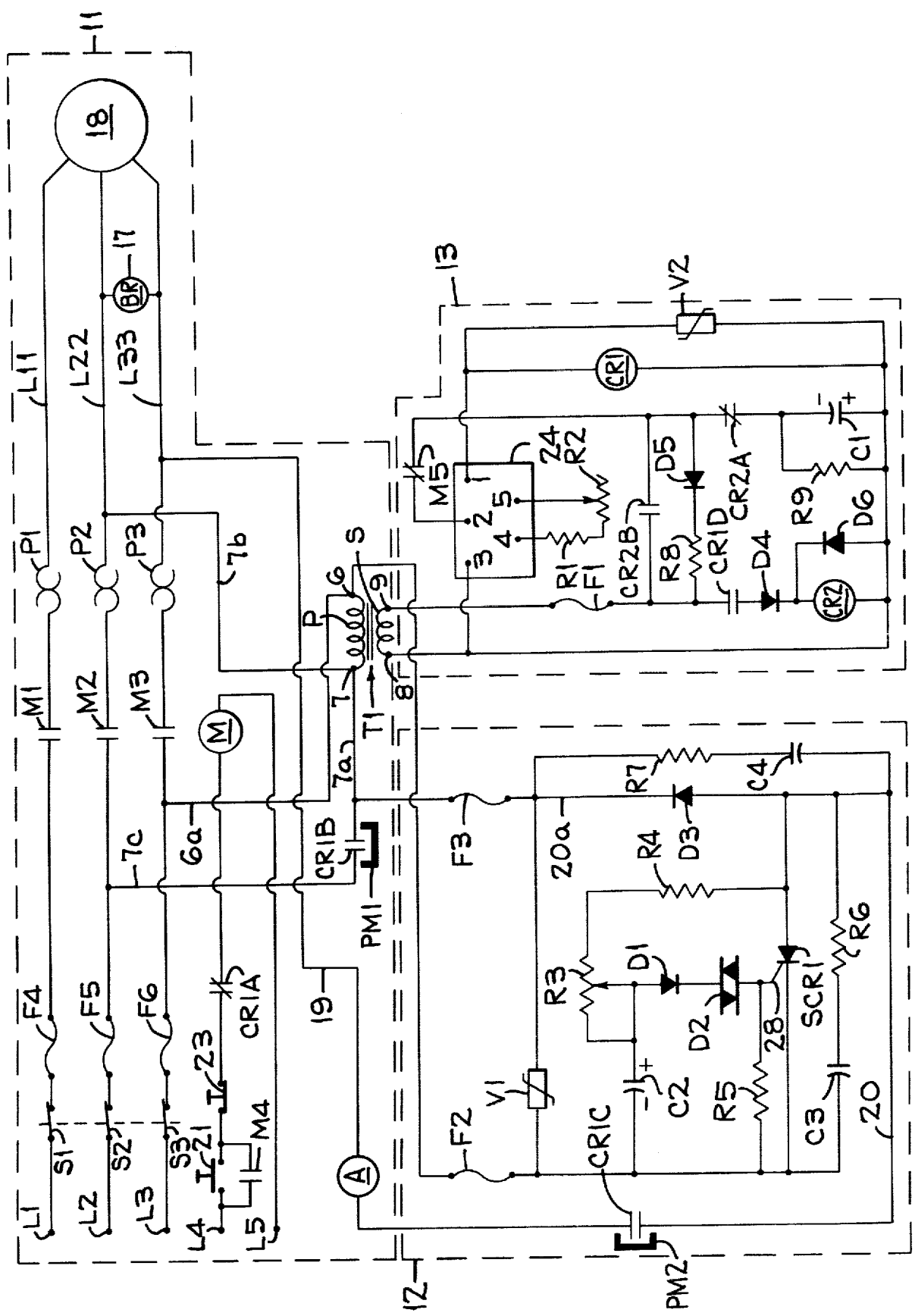

ELECTRONIC MOTOR BRAKING SYSTEM

BACKGROUND OF THE INVENTION

1. Field of the Invention

This invention relates to electronic motor braking systems, and more particularly, to an electronic braking system having means for quickly applying a DC braking current to an AC motor when the running current is terminated.

2. Description of the Prior Art

Electronic or dynamic braking for slowing down and stopping electrical AC motors is well known in the motor art. It offers the advantage of being smooth, it provides accurately timed stops and is not subject to the severe problems of rubbing surfaces used in mechanical braking systems. Dynamic braking employs the principle of removing an alternating current from the motor and applying an amplitude and time controlled DC current to the stator windings of the AC motor. The DC current produces a static field across the stator which generates a counterforce in the rotor of the motor to rapidly decelerate the motor without any mechanical braking. Preferably this dynamic braking is achieved without any modification of the motor or a parallel connected motor brake AC solenoid. A mechanical brake is employed to hold the motor in a stopped position and may also be used to help bring the motor to a complete stop.

Some of the prior art dynamic braking circuits employ a timing circuit which is connected between two of the AC power lines which are connected to the AC motor. A brake release coil is connected across the same lines and when energized the coil holds a spring loaded mechanical brake mounted on the motor in its released position. As long as power is uninterruptedly connected to the aforesaid motor lines the brake release coil disengages the mechanical brake from the motor. After the timer has completed its timing sequence, the release coil is de-energized and the mechanical brake is engaged by the brake spring.

Unfortunately, a slight interruption in the supply of current to the brake release coil (such as the interruption which can occur during changeover from AC power to electric braking) causes the mechanical brake to be prematurely applied to the motor. This causes brake heating and fade if the brake is engaged at a high motor speed. What is needed is a timed DC braking circuit which applies dynamic braking current when the motor is disconnected from the AC power source so quickly that if a mechanical brake coil is connected across the motor lines, the brake coil will remain sufficiently energized to hold the mechanical brake in its released position for a predetermined amount of dynamic braking time, and does not apply any mechanical braking in the event of a failure of the braking circuit or its timer while the motor is running under power.

SUMMARY OF THE INVENTION

The present invention comprises a timed dynamic electronic braking system for supplying DC braking current to an electric motor for a predetermined amount of time after the motor is disconnected from its electrical AC power source. The electronic braking system of the present invention can be connected to an existing three phase AC motor system and requires no changes or additional wiring for the motor or to its electro-mechanical brake (if present) between the motor control cabinet up to and including the motor. When the system of the present invention is connected into an existing circuit, the only change in the circuit that is required is the addition of a single relay contat in the 110 volt AC start-stop circuit.

The system of the present invention provides a rapid change-over from a motor running condition to the electric braking period, which prevents a friction brake release coil from becoming de-energized long enough so that it causes the mechanical brake to set. If the mechanical brake is permitted to set during change-over, the magnitude of the DC braking current would be insufficient to release the mechanical brake by operating the brake release coil plunger and hence the soft stop characteristics of dynamic braking would be lost. Also, under the aforesaid conditions the mechanical brake would overheat and fade if the motor inertia were high when the brake engaged. As mentioned, the electronic braking system of the present invention has such a rapid switchover from normal motor power conditions to dynamic braking conditions that when the "stop" button on the motor control circuit is depressed, dynamic braking begins instantly and before an electromechanical brake coil, which had been holding the mechanical brake release, can be de-energized sufficient to accept the mechanical brake.

Another feature of the invention is that when the motor is at rest, such as at the end of a process or shift, the braking system is entirely de-energized by means of open mechanical contacts as long as the motor starter contactor is open. This precludes undesired application of electric braking current to the motor in case of failure of a solid state component of the system while the motor is unattended by an operator.

Furthermore, there is no energy consumed by the system of the present invention during the aforesaid inoperative period because even a control transformer forming part of the control circuit is disconnected from the power line, as opposed to prior systems wherein the control transformer and some of its associated circuitry are energized at all times, even though no function is being performed thereby.

The quick changeover characteristic of the system of the present invention is provided by charging a capacitor from the AC source when the motor is in operation and by providing the capacitor with a discharge circuit when the motor is turned off so that the capacitor can discharge rapidly and provide over-excitation of a contactor coil in the discharge circuit to enable the contactor to pull in to operate its various contacts quickly. The resultant quick connection of the braking system by the discharge of a capacitor takes maximum advantage of a high circulating current through the motor field that persists for the time represented by a few cycles, after the AC source has been disconnected from the motor. Said circulating current is generated by the transformation of stored magnetic energy in the motor field to a flow of direct current as the field collapses upon turn off of the motor, provided a path is provided for this potential circulating current. The system of the present invention provides such a path by connecting a closed loop circuit to the motor stator windings which includes a diode. The pulses of current circulating around the aforesaid circuit loop contribute to motor deceleration before the dynamic braking system of the present invention supplies rectified line current through a thyristor to the stator lines of the motor. The resultant brief period of high level circulating current that occurs before the main dynamic braking current builds up to the predetermined level, provides a rapid drop in the speed of the rotor to a speed as low as about 80% of its synchronous speed before rectified AC line current is applied to provide the remainder of the electric braking action.

In the present system, a thyristor power circuit selectively connected to its power source upstream of the motor contactors and to the motor downstream of the contactors provides a DC braking current for the motor when the motor is de-energized by means of a control circuit which operates instantly when the motor stop button is operated. In the control circuit, the discharge of the aforesaid capacitor, which had been charged while the motor was running, instantly supplies a pulse of contactor energizing current to a contactor to quickly connect the stator field current loop as well as a dynamic electric braking power circuit to the motor when the motor is disconnected from the AC power source, thereby providing rapid switch over from power to braking operation. A timer in the control circuit also is energized which allows braking current to flow in the power circuit for a predetermined period of time to quickly bring the motor to a stop before a mechanical brake is applied.

Another feature is that when the motor is stopped and its contactors open the control and power circuits are automatically de-energized. This saves energy and precludes application of electric braking current to the motor due to failure of a solid state circuit component in the system while the motor is unattended by the operator.

BRIEF DESCRIPTION OF THE DRAWING

The FIGURE of the drawing is a schematic diagram of an improved electronic braking power and control circuit of the present invention.

DESCRIPTION OF THE PREFERRED EMBODIMENT

An electronic braking system of the present invention comprises an AC motor circuit 11, a DC power circuit 12, a timing and control circuit 13 and an electromechanical brake coil 17 for a mechanical brake (not shown). The motor circuit 11 includes a three phase induction motor 18 having the stator windings connected to a source of three phase AC power by a plurality of overload protectors P1-P3, contacts M1-M3, and disconnect switches S1-S3. The switches S1-S3 are normally left closed during the operation of the circuit and the motor is turned on and off by the usual relay start-stop circuit which connects the contacts M1-M3 to a power source such as three phase 460 volts, connected to a plurality of terminals L1-L3. The start-stop circuit includes a push-button start switch 21, a push-button stop switch 23, and a normally closed contact CR1A to control the power to a contactor M. The contactor M controls a plurality of normally opened contacts M1-M4 and a normally closed contact M5. In the drawing the contacts are shown in the condition present when the contactor M is de-energized.

When the start button 21 is depressed AC power from a pair of terminals L4,L5 is coupled through the start-stop switches 21,23 and the normally closed contactor contact CR1A to energize the contactor M which closes the motor contacts M1-M4 and opens the control circuit contact M5. The closed contacts M1-M3 apply three phase AC voltage from input terminals L1-L3 to energize the motor 18 through motor lines L11,L22, and L33 and the closed holding contact M4 bypasses the start switch 21 to keep the solenoid M energized after the start button 21 is released. The normally closed contact M5 in the control circuit 13 is open when the motor is running and is only closed when the contactor M is de-energized by the motor stop switch 23. Details of an electro-mechanical brake which can be used with the motor 18 are disclosed in a copending patent application Ser. No. 919,314 filed May 24, 1978, by Richard M. McCarthy and assigned to the assignee of the present invention. The motor brake (not shown) is urged to its braking position by a spring on the brake when the coil 17 is de-energized. The brake is held in its released condition against the force of the spring when the coil 17 is energized from the motor lines L22,L33.

Terminal 6 of the primary winding P of the transformer T1 is always connected to the source line L3 by a line 6a. Terminal 7 of the primary winding is energized by line 7b and the motor line L22 when the motor is running and by line 7a, a contact CR1B that bridges contactor M2, a line 7c and source line L2 when the motor contacts M1-M3 are open. The secondary winding S of the transformer supplies AC to the control circuit 13.

The DC power circuit 12 receives AC power from one phase of the three phase AC source on terminals L2, L3 and converts it into a DC braking current for dynamic braking of the motor 18. The power circuit also includes a current circulating loop for employing current generated by the magnetic field in the stator as a DC braking current. The power circuit 12 includes a braking current amplitude control R3 to adjust the amount of the DC braking current received by the motor 18 during the dynamic braking period and thus, adjusts the rate of deceleration of the motor. A thyristor SCR1 conducts on alternate halves of each AC cycle (when contact CR1C is closed) to convert the AC power into pulsating DC current, and a firing circuit which includes resistors R3-R5, a capacitor C2, diode D1 and diac D2 determines the number of degrees of the AC cycle that SCR1 conducts and thus determines the total amount of DC current provided during each half cycle. The conduction time of SCR1 can be changed by adjusting the setting of the variable resistor R3 and thus controlling the amplitude of the triggering voltage on a gate 28 of SCR1. The diac D2 fires and provides a quick turn-on of the SCR1 when the voltage across capacitor C2 and across the diac D2 reaches the firing level of the diac. A resistor R6 and a capacitor C3 comprise a filter circuit which protects the SCR1 from large transient voltages which could damage the SCR.

Line 19, contact CR1C, line 20 and a "free-wheeling" diode D3 and lines 20a, 7a, and 7b provide a path for motor current generated by the collapse of the magnetic field in the motor stator when the motor is initially disconnected from the power source and provides a path for current during the alternate half cycles when SCR1 is de-energized. A resistor R7 and a capacitor C4 protect the diode D3 from transient voltages.

The timing and control circuit 13 includes a contactor CR1 having a contact CR1B which connects the DC power circuit between the AC source and the motor 18 whenever an energizing current is applied to the relay CR1. A capacitor C1 provides a pulse of energizing current to the coil of contactor CR1 as soon as the main motor contactor M is de-energized and a timer 24 provides an energizing current for a predetermined period of time following the energizing pulse. The result is a fast turn-on of the DC braking current with a large initial value of DC braking current to provide a rapid decrease in the motor speed, followed by a smaller value of DC braking current for an accurately controlled period of time.

To start the motor 18, the switches S1–S3 are closed to connect the contacts M1–M3 to the three phase power source at terminals L1–L3. When the starter button 21 is depressed the AC voltage from the terminals L4 and L5 energizes the coil of the contactor M to close the contacts M1–M4 and open the contact M5. The closed contacts M1–M3 provide running current to the motor 18 and the contact M2 connects the primary P of the transformer T1 between terminal L3 and power line L22 to energize the transformer. A voltage across a transformer secondary winding S causes a current to flow from terminal 8 of the secondary winding to the lower plate of the capacitor C1, from the upper plate of C1 through the normally closed contact CR2A, diode D5 and resistor R8 to transformer terminal 9 to charge the capacitor C1 to the polarity shown. The capacitor C1 remains charged during the time the motor 18 is energized.

When the stop button 23 is depressed, the contacts M1–M5 return to the de-energized position shown in the drawing and power is removed from the motor 18 due to the opening of contacts M1–M3. Contact M5 closes causing a pulse of energizing current to flow from the lower plate of capacitor C1 through the coil of the contactor CR1, from terminal 1 to terminal 2 of the timer 24, through contactor contacts M5 and normally closed contact CR2A to the upper plate of C1. The current pulse causes the contacts of contactor CR1 to quickly switch positions with the CR1A contact opening and contacts CR1B–CR1D closing. Opening the contact CR1A insures that the coil of contactor M remains de-energized during the dynamic braking period. Closing the contact CR1C connects the diode D3 in parallel with the braking coil 17 to provide a low resistance path between lines L22 and L33 when the contacts M1–M3 are open. When the contacts M1–M3 open the rotating motor 18 generates an EMF (voltage) between the lines L22 and L33 causing a relatively large DC current to flow through the stator winding of the motor 18, from the line L33, through the ammeter A, the closed contact CR1C, diode D3 and fuse F3 to the line L22. The large DC current through the motor stator windings provides a strong magnetic field which reacts with the revolving motor rotor to provide a powerful braking force on the motor and rapidly decrease the rotor speed.

The closed contact CR1B is in parallel with the contact M2 and provides voltage to the primary winding P of transformer T1 from the power terminals L3 and L2. When the contact CR1B, CR1D reach a stable closed equilibrium state the energized secondary winding S is connected across the diode D4 and the relay coil CR2 by the closed contact CR1D thereby providing pulses of current for energizing the relay CR2 to open the contact CR2A and close the contact CR2B. A diode D6 serves to smooth the current through the coil of the relay CR2. Opening the contact CR2A disconnects the upper plate of capacitor C1 from the terminal 2 of the timer 24, but closing the contact CR2B causes a current to flow from terminal 8 of the transformer secondary through the coil of contactor CR1, from terminal 1 to terminal 2 of the timer 24 and contacts M5, CR2B to terminal 9 of the transformer secondary winding to keep the contator CR1 energized for a period of time which is determined by the timer 24. A timer which can be used in the present invention is the model TS2422 built by the SSAC Inc. of Liverpool, NY. The duration of time that current flows from terminal 1 to terminal 2 of the timer 24 and that contactor CR1 is energized is determined by the setting of the variable resistor R2 and the value of resistor R1.

When the EMF of the motor 18 decreases sufficiently the SCR is rendered conductive and a dynamic braking current flows from the power terminal L2 through contact CR1B, to line L22, through the motor to line L33, through ammeter A, CR1C and the thyristor SCR1 to terminal L3 on alternate half cycles of the voltage between terminals L2 and L3 as long as the contactor CR1 is energized. The total amount of DC braking current through the motor and through SCR1 is determined by the setting of R3 as discussed hereinbefore. During the half cycle when SCR1 is nonconductive, the motor's stored kinetic energy provides a braking current which flows from line L33 through ammeter A, contact CR1C and diode D3 to line L22. The braking currents react with the revolving motor rotor to provide a strong braking force which quickly decreases the motor speed. The timer 24 can be adjusted to provide braking current until the motor comes to a complete stop or the motor speed can be reduced to a low value and the mechanical brake applied to complete the stopping action. At the end of the timing period the timer 24 terminates the current between the timer terminals 1 and 2, the contactor CR1 de-energizes and the contactor contacts CR1B–CR1D open. The open contact CR1B de-energizes the transformer T1 and the open contact CR1C terminates the braking current allowing the mechanical brake to engage the motor 18. A resistor R9 across the capacitor C1 discharges the capacitor C1 and prevents a potentially dangerous voltage from remaining across the terminal of this storage capacitor. The ammeter A is used to monitor the value of the braking current and aids in obtaining a correct adjustment of the current control resistor R3. A plurality of fuses F1–F6 provide overcurrent protection for various portions of the circuits. A pair of varistors V1 and V2 limit the transient voltage across portions of the circuit to prevent damage to the circuit elements. A pair of permanent blowout magnets PM1, PM2 reduce arcing when the contacts CR1B, CR1C are opened.

The present invention can quickly apply a DC braking current to the motor due to overexcitation current applied to the contactor CR1 by capacitor C1 when the stop button is depressed, and provides control of both dynamic braking time and the amount of dynamic braking current. If the timer circuit should fail due to an open internal circuit, the motor 18 could still be operated. The motor could be started by pressing the start button 21 in the normal manner and the motor could be stopped by using the mechanical brake.

Although the best mode contemplated for carrying out the present invention has been herein shown and described, it will be apparent that modification and variation may be made without departing from what is regarded to be the subject matter of the invention.

What is claimed is:

1. An electronic braking system for supplying a DC braking current to an AC induction motor for a predetermined amount of time after said motor is disconnected from an electric power source, said system providing mechanical braking to said motor when said braking current is terminated, said system comprising:
- a power circuit for connection to said power source to provide DC braking current to said motor;
- means for rapidly connecting said power circuit between said motor and said electric power source in response to an energizing current;
- means for generating a pulse of energizing current when said motor is disconnected from said power source;
- means for supplying an energizing current for a predetermined time; and
- means for providing mechanical braking of said motor when said DC braking current is terminated.

2. An electronic braking system as defined in claim 1 wherein said connecting means includes means for selectively connecting said power circuit to said motor and means for selectively connecting said power circuit to said electrical power source.

3. An electronic braking system as defined in claim 1 wherein said pulse of energizing current decreases the time required to connect said power circuit between said motor and said electric power source.

4. An electronic braking system as defined in claim 1 wherein said pulse generating means includes an electrical storage element and means for coupling electrical energy from said power source to said storage element during the time said motor is connected to said power source.

5. An electronic braking system for supplying a DC braking current to an AC induction motor for a predetermined amount of time afer said motor is disconnected from an AC power source, said system providing mechanical braking to said motor when said DC braking current is terminated, said system comprising:
- a power circuit for connection to said power source to provide DC braking current to said motor;
- means for connecting said power circuit between said motor and said power source in response to an energizing current;
- means for generating a pulse of energizing current when said motor is disconnecated from said power source;
- means for supplying an energizing current for a predetermined amount of time;
- a mechanical brake engageable with said induction motor;
- means for disengaging said brake from said motor while said DC braking current is supplied to said motor; and
- means for engaging said brake with said motor at the termination of a current to said motor.

6. An electronic braking system as defined in claim 5 including means for isolating said motor and said power source from said power circuit when said motor is connected to said power source.

7. An electronic braking system as defined in claim 5 including means for adjusting the value of the DC braking current supplied to said motor.

8. An electronic braking system as defined in claim 5 wherein said pulse generating means includes an electrical storage element and means for coupling electrical energy from said power source to said storage element.

9. An electronic braking system as defined in claim 5 including means for adjusting the amount of time that braking current is supplied to said motor after said motor is disconnected from said power source.

10. An electronic braking system for an alternating current motor having a stator winding adapted to be connected to an AC power source for energizing said motor and a power contactor for selectively connecting said stator winding to said AC power source to operate said motor, said system comprising:
- a power circuit for using power from said power source to supply a DC braking current to said stator winding of said motor when said power circuit is connected to said stator winding;
- means for connecting said power circuit between said power source and said stator winding in response to an energizing current;
- means for coupling a pulse of energizing current to said connecting means when said stator winding is disconnected from said power source;
- means for supplying an energizing current to said connecting means for a predetermined period of time; and p1 means for providing mechanical braking of said motor when said energizing current is terminated.

11. An electronic braking system as defined in claim 10 including means for connecting said power circuit between said power source and said stator windings without disconnecting said power contactor from said motor and from said AC power source.

12. An electronic braking system as defined in claim 10 including means for using an EMF developed by said motor to supply a large braking current when said motor is initially disconnected from said power source.

13. An electronic braking system as defined in claim 12 wherein said braking current supply means includes a diode and means for connecting said diode to said stator winding when said stator winding is disconnected from said power source.

14. An electronic braking system as defined in claim 12 wherein said power circuit includes means for supplying said DC braking current to said stator winding of said motor during both halves of an AC cycle of said AC power source.

15. An electronic braking system as defined in claim 12 including: a first rectifying means connected between said AC power source and said stator winding of said motor to supply a braking current for a portion of one half of an AC cycle, and a second rectifying means connected across said stator winding to supply a braking current through said stator winding for the remainder of said AC cycle.

16. A dynamic electronic raking system for an AC induction motor having motor lines connected to an AC source through motor contactors and a start-stop circuit for controlling the motor contactors, said system comprising:
- a DC power braking circuit for receiving AC power from said source, said power braking circuit having gated rectifier means for supplying pulsating DC braking current to said motor lines;
- a braking control contact for activating said power braking circuit;
- a control circuit for activating said braking control contact, said control circuit including a capacitor;
- mean for charging said capacitor from said AC source when said start-stop circuit is in its motor run condition;
- a circuit for discharging said capacitor, said discharge circuit including a main control contactor coil and a normally closed motor contact that is open when said start-stop circuit is placed in its motor run condition, the placement of said start-stop circuit in its motor stop condition closing said normally closed motor contact for immediately discharging said capacitor through said motor contact and said main control contactor coil, said main control contactor coil thereby closing said braking control contact and activating said DC power braking circuit for slowing down the de-energized motor.

17. The circuit of claim 16 including a motor field current-collapse loop in said power braking circuit, said loop being connected to said motor lines and including a rectifier and said braking control contact, closing of said contact completing a circuit through said loop.

18. The circuit of claim 16 including timer in said capacitor discharge circuit for initiating a braking current timing period when said capacitor discharges.

19. The circuit of claim 18 including means receiving power from said AC source for maintaining said timer in operation after discharge of said capacitor.

20. The circuit of claim 19 wherein said means for charging said capacitor and for maintaining said timer in operation is a transformer having its primary winding energized from said AC source and its secondary winding energizing said control circuit.

21. The circuit of claim 19 comprising contact means for automatically disconnecting said power braking and said control circuits from said AC source when said timer times out.

22. A dynamic electronic braking system for an AC induction motor, said system having at least two AC source lines with a power contact connected between each source line and a motor line, said system comprising:

a normally open first relay contact bridging the power contact of one line;

a transformer having a primary widening with one end connected to the motor line side of said first relay contact and the other end connected to the other power line on the source side of its power contact;

a control circuit including a secondary winding of said transformer and a capacitor charging circuit connected across said secondary transformer winding, said charging circuit including a pulse capacitor in series with a rectifier, said source lines charging said capacitor by energizing said transformer primary winding from the motor side of said one line and the source side of said other line when said power line contacts are closed for motor operation;

a capacitor discharge circuit connected across said capacitor, said discharge circuit including a main relay coil for said first relay contact and a timer, opening of said power line contacts momentarily de-energizing said one end of the primary of said transformer and causing said capacitor to discharge through said discharge circuit thereby energizing said main relay coil to close said first relay contact for re-energizing said one end of said transformer primary winding as well as for starting said timer;

a DC power braking circuit connected to two of said motor lines on the motor side of their contacts; and pl a second relay contact for activating said DC braking circuit when said main relay coil is energized.

* * * * *